United States Patent
Sotoodeh

(10) Patent No.: US 7,233,663 B2
(45) Date of Patent: Jun. 19, 2007

(54) KEY GENERATION PERFORMANCE IMPROVEMENT

(75) Inventor: Mehdi Sotoodeh, Mission Viejo, CA (US)

(73) Assignee: Safenet, Inc., Belcamp, MD (US)

( * ) Notice: Subject to any disclaimer, the term of this patent is extended or adjusted under 35 U.S.C. 154(b) by 822 days.

(21) Appl. No.: 10/282,700

(22) Filed: Oct. 29, 2002

(65) Prior Publication Data

US 2003/0108193 A1 Jun. 12, 2003

Related U.S. Application Data

(60) Provisional application No. 60/350,092, filed on Oct. 29, 2001.

(51) Int. Cl.
*H04K 1/00* (2006.01)
*H04L 9/00* (2006.01)
*G06F 7/38* (2006.01)
*G06F 7/00* (2006.01)

(52) U.S. Cl. .............. 380/28; 380/30; 380/44; 708/491; 708/492

(58) Field of Classification Search ............... None
See application file for complete search history.

(56) References Cited

U.S. PATENT DOCUMENTS

| | | | | |
|---|---|---|---|---|
| 4,944,007 A | * | 7/1990 | Austin ............... | 713/180 |
| 5,101,431 A | * | 3/1992 | Even | |
| 5,442,707 A | * | 8/1995 | Miyaji et al. ............. | 380/30 |
| 5,504,817 A | * | 4/1996 | Shamir | |
| 5,644,639 A | * | 7/1997 | Naciri et al. | |
| 5,745,571 A | * | 4/1998 | Zuk | |
| 5,764,554 A | * | 6/1998 | Monier | |
| 5,793,659 A | * | 8/1998 | Chen et al. | |
| 5,867,412 A | * | 2/1999 | Suh | |
| 6,209,016 B1 | * | 3/2001 | Hobson et al. | |
| 6,230,178 B1 | * | 5/2001 | Pomet | |
| 6,282,290 B1 | * | 8/2001 | Powell et al. | |
| 6,356,636 B1 | * | 3/2002 | Foster et al. | |
| 6,408,075 B1 | * | 6/2002 | Ohki et al. | |
| 6,415,310 B1 | * | 7/2002 | Takenaka et al. | |
| 6,868,160 B1 | * | 3/2005 | Raji ............... | 380/30 |
| 7,020,283 B1 | * | 3/2006 | Wada et al. ........... | 380/46 |

(Continued)

OTHER PUBLICATIONS

Schneier, B., Applied Cryptography, (John Wiley & Sons, Inc., 2$^{nd}$ ed. 1996), pp. 233-263, 466-474.*

*Primary Examiner*—Ayaz Sheikn
*Assistant Examiner*—Trang Doan
(74) *Attorney, Agent, or Firm*—Venable, LLP; James R. Burdett; Jeffri A. Kaminski

(57) ABSTRACT

A method, apparatus, and article of manufacture provide the ability to rapidly generate a large prime number to be utilized in a cryptographic key of a cryptographic system. A candidate prime number is determined and a mod remainder table is initialized for the candidate prime number using conventional mod operations. If all mod remainder entries in the table are non-zero, the candidate number is tested for primality. If the candidate prime number tests positive for primality, the candidate number is utilized in a cryptographic key of a cryptographic system. If any of the table entries is zero, the candidate number and each mod remainder entry are decremented/incremented. If any mod remainder entry is less than zero or greater than the corresponding prime number, the corresponding prime number is added/subtracted to/from the mod remainder. The process then repeats until a satisfactory number is obtained.

48 Claims, 3 Drawing Sheets

U.S. PATENT DOCUMENTS 7,043,018 B1 * 5/2006 Kasahara et al. ............ 380/44
2001/0010077 A1 * 7/2001 McGregor et al.
2001/0033655 A1 * 10/2001 Vadekar et al.
2002/0039418 A1 * 4/2002 Dror et al.
2002/0122554 A1 * 9/2002 Lilly

* cited by examiner

KEY GENERATION PERFORMANCE IMPROVEMENT

CROSS-REFERENCE TO RELATED APPLICATIONS

This application claims the benefit under 35 U.S.C. Section 119(e) of the following co-pending and commonly-assigned U.S. provisional patent application, which is incorporated by reference herein:

Provisional Application Ser. No. 60/350,092, filed Oct. 29, 2001, by Mehdi Sotoodeh and Reed H. Tibbetts, entitled "KEY GENERATION PERFORMANCE IMPROVEMENT," attorneys' docket number 30074.37-US-P1.

This application is related to the following co-pending and commonly-assigned U.S. patent application, which is incorporated by reference herein:

U.S. patent application Ser. No. 09/449,159, filed Nov. 24, 1999, by Shawn D. Abbott, Bahram Afghani, Mehdi Sotoodeh, Norman L. Denton III, and Calvin W. Long, entitled "USB-COMPLIANT PERSONAL KEY WITH INTEGRAL INPUT AND OUTPUT DEVICES," attorneys' docket number 30074.26-US-I1, which application is a continuation-in-part of U.S. patent application No. 09/281,017, filed Mar. 30, 1999 by Shawn D. Abbott, Bahram Afghani, Allan D. Anderson, Patrick N. Godding, Maarten G. Punt, and Mehdi Sotoodeh, entitled "USB-Compliant Personal Key," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, entitled "USB-Compliant Personal Key," which applications are hereby incorporated by reference herein.

BACKGROUND OF THE INVENTION

1. Field of the Invention

The present invention relates generally to cryptographic systems, and in particular, to a method, apparatus, and article of manufacture for the rapid generation of large prime numbers for use in a cryptographic system.

2. Description of the Related Art

Computer use has proliferated and continues to expand as technological capabilities rapidly increase. With this proliferation, computers often communicate and exchange information across a network. However, computer hackers and other persons often attempt to gain unauthorized access to such communications and information. To prevent unauthorized access, the messages and information may be encrypted. Encryption methods vary from using an external device known as a hardware key (or "dongle") to using secret key encryption such as DES (Data Encryption Standard) or public key encryption (such as RSA). Many such encryption methods utilize and need prime numbers. However, because of the mathematical algorithms required to generate large prime numbers and the limited resources available in a typical cryptographic hardware token, the time required to generate a pair of keys (utilizing large prime numbers) is often on the order of several minutes. Accordingly, what is needed is a method for rapidly generating large prime numbers on a token. The problems and disadvantages of the prior art may be better understood by describing prior art encryption and the generation of keys.

As described above, one solution to prevent unauthorized access uses an external device known as a hardware key, or "dongle". A dongle is coupled to an input/output (I/O) port of the host computer. An application executing on the host computer sends a code to that I/O port, and the dongle responds by reading out its serial number, which verifies its presence to the program. The dongle hinders software duplication, because each copy of the program is tied to a unique number, which is difficult to obtain, and the key has to be programmed with that number.

While the use of such hardware keys is an effective way to reduce software piracy, to date, their use has been substantially limited to high value software products. Hardware keys have not been widely applied to popular software packages, in part, because the hardware keys are too expensive, and in part, because there is reluctance on the part of the application program user to bother with a hardware key whenever use of the protected program is desired. Also, in many cases, the hardware keys are designed for use with only one application. Hence, where the use of multiple applications on the same computer is desired, multiple hardware keys must be operated at the same time.

In addition to dongles, other methods that utilize software encryption have been widely utilized. Simple encryption is the most common method of securing data. Both secret key encryption (e.g., DES (Data Encryption Standard)) and public, key encryption (e.g., RSA encryption) methods that use both a public and a private key are implemented. Public and private key encryption methods allow users to send Internet and e-mail messages without concern that the message will be read by unauthorized persons or that its contents will be tampered with.

Secret key encryption such as DES operates as a block cipher. Data is encrypted in 64-bit blocks. A 64-bit block of plaintext goes in one end of the algorithm, and a 64-bit block of ciphertext comes out the other end. The same algorithm and key are used for both encryption and decryption (except for minor differences in the key schedule). The key can be any 56-bit number (the remaining bits are utilized for parity checking), and may be changed at any time. To encrypt data using DES, a block of data is encrypted using a substitution followed by a permutation based on the key.

Various public-key encryption methods have been adopted and used in the prior art. One such method is RSA (Rivest-Shamir-Adleman) encryption. With RSA encryption, data is encrypted using a recipient's public key, which can only be decrypted by the recipient's private key. The security that exists in RSA encryption is based on the difficulty of factoring large numbers. The public and private keys are based on a pair of large prime numbers. Accordingly, to utilize RSA, two large prime numbers must be obtained. Details regarding RSA encryption are described in Bruce Schneier, "Applied Cryptography, Second Edition, Protocols, Algorithms, and Source Code in C", pages 466–474 John Wiley & Sons, Inc. 1996), which is incorporated by reference herein.

Various methods have been developed to obtain a number and determine if the number is prime. Some such methods determine if a number is prime by trying to determine the factors of the number. Accordingly, some methods may generate random numbers and attempt to factor those numbers. Such a method may not be frequently used. Alternatively, in a more frequently used method, random numbers are generated and tested to determine if they are prime. However, testing if a number is prime may fail frequently, forcing the selection and testing of a random number repeatedly. In this regard, it often takes on the order of several minutes to generate an RSA key pair.

For example, one method for generating a prime number checks to make sure a random number is not divisible by a set of small prime numbers (e.g., 3, 5, 7, 11, etc.). Thus, some methods may test the random number for divisibility by all primes less than a certain number (e.g., 256 or 2000). Further, some methods may not generate random numbers but may incrementally search through numbers starting at a random point until a prime is found. Such prior art methods of generating prime numbers are described in Bruce Schneier, "Applied Cryptography, Second Edition, Protocols, Algorithms, and Source Code in C", pages 233–263 John Wiley & Sons, Inc. 1996), which is incorporated by reference herein.

In view of the above, there are various methods for encrypting information and determining prime numbers to be utilized in the encryption. However, the prior art methodologies are slow and inefficient. Accordingly, what is needed is a method for rapidly generating large prime numbers for use in a cryptographic system.

SUMMARY OF THE INVENTION

Prime numbers are principal components for the generation of keys used to encrypt information, data, and messages. However, if a small prime number is utilized in the encryption, hackers may more easily obtain unauthorized access. Accordingly, it is desirable to obtain large prime numbers for use in cryptographic keys. Due to the existing prior art methodologies and available resources, obtaining a large prime number may be a time consuming and frustrating process.

One or more embodiments of the invention speed up the large prime generation process. The concept behind the method is to speed up the evaluation of prime factors whose value is less than a particular value (e.g., 256). In this regard, a table of mod remainders for all odd prime numbers less than the particular value may be maintained. The table is maintained and used in a series of five steps. (1) A table for a candidate large prime initialized using conventional mod operations. (2) If all of the table entries are non-zero, primality testing (e.g., Fermat testing) of the candidate large number may be performed. (3) Otherwise, the candidate large prime and all table entries are decremented by a particular even value (e.g., 2). (4) If any table entry is less than zero, the corresponding prime is added to maintain the mod remainder nature. (5) The process then repeats starting at step (2).

In another embodiment, the five steps involve incrementing the candidate large prime and table values as follows: (1) A table for a candidate large prime initialized using conventional mod operations. (2) If all of the table entries are non-zero, primality testing (e.g., Fermat testing) of the candidate large number may be performed. (3) Otherwise, the candidate large prime and all table entries are incremented by a particular even value (e.g., 2). (4) If any table entry is greater than or equal to the corresponding prime number, the corresponding prime is subtracted to maintain the mod remainder nature. (5) The process then repeats starting at step (2).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability to rapidly generate large prime numbers on a hardware token. To rapidly generate the prime numbers, the evaluation of smaller prime factors is expedited. To expedite the evaluation, a table of mod remainders for a set of small prime numbers is maintained and used.

Hardware Environment

Figure 1:
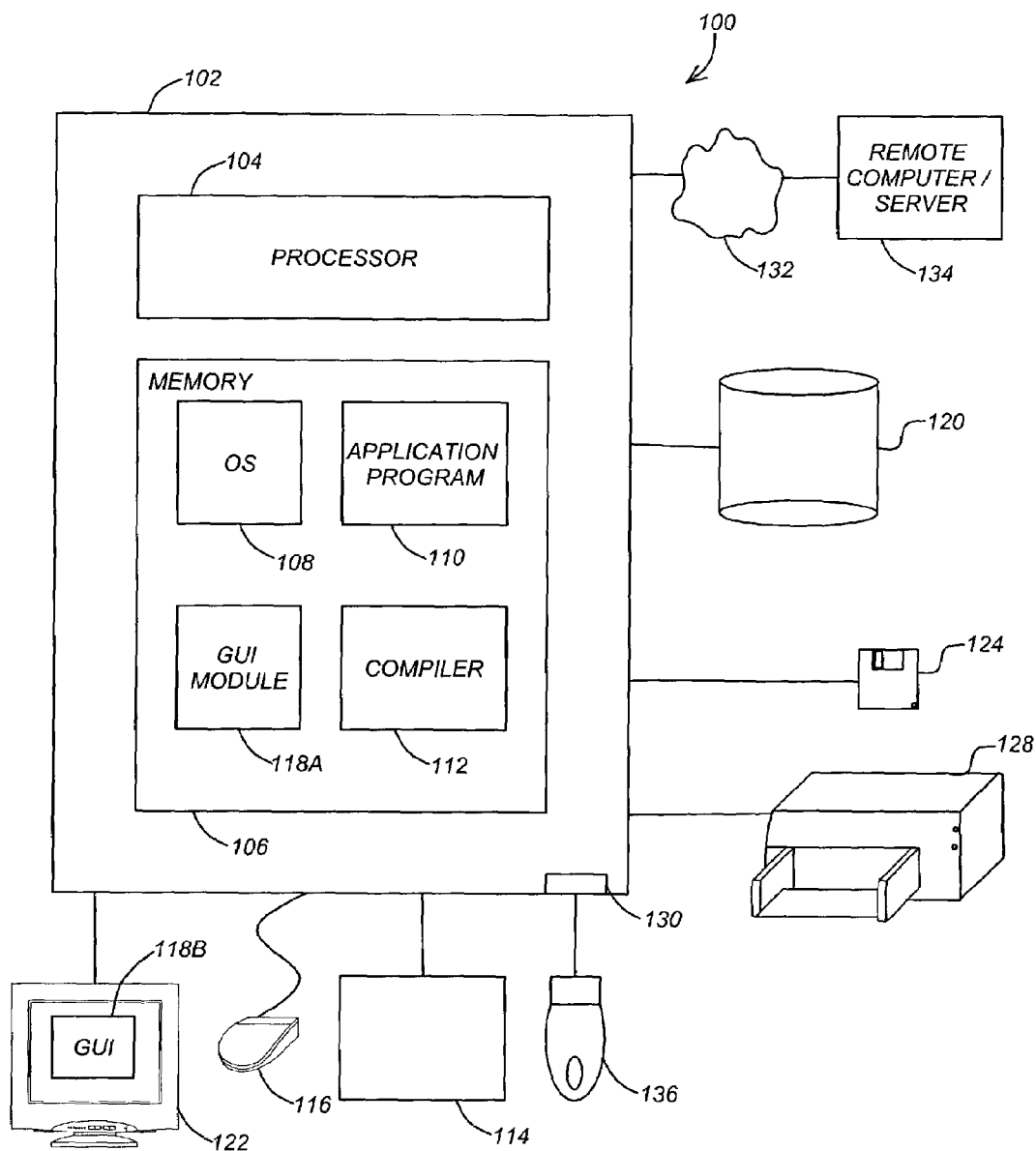
FIG. 1 illustrates an exemplary computer system 100 that could be used to implement one or more embodiments of the invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programing language such as COBOL, C++, FORTRAN, or other language to be translated into processor 104 readable code. After compilation, the application 110 accesses and manipulates data stored in the memory 106 of the computer 102 using the relationships and logic that are generated using the compiler 112. The computer 102 may also comprise an input/output (I/O) port 130 for a personal token 136 (hereinafter alternatively referred to also as a personal key 136). In one embodiment, the I/O port 130 is a USB-compliant port implementing a USB-compliant interface.

The personal key 136 may include a processor and a memory which implement software protection schemes to prevent copying and unauthorized use. The personal key 136 provides for the storage and management of digital certificates, allowing the user to store all of his digital certificates in one media that is portable from platform to platform. The personal key 136 provides for the generation, storage, and management of many keys, prime numbers, and/or passwords, providing additional security.

Since the personal key 136 represents a single, secure repository for a great deal of the data the user may need to use and interact with a variety of computer platforms, the personal key may be able to interface (i.e., transmit and receive data) with a large variety of computers and computer peripherals. Hence, one embodiment of the personal key 136 may include an electromagnetic wave transception device such as an infrared (IR) transceiver. This transceiver allows the personal key 136 to exchange information with a wide variety of computers and peripherals without physical coupling.

In one embodiment, the present invention comprises a compact, self-personal contained, personal token or key. The personal key 136 may comprise a USB-compliant interface releaseably coupleable to a host processing device 102; a memory 106, and a processor 104. The processor 104 provides the host processing device 102 conditional access to data storable in the memory 106 as well as the functionality required to manage files stored in the personal key 136 and for performing computations based on the data in the files. In one embodiment, the personal key 136 also comprises an integral user input device and an integral user output device. The input and output devices communicate with the processor 104 by communication paths which are independent from the USB-compliant interface, and thus allow the user to communicate with the processor 104 without manifesting any private information external to the personal key 136. A more detailed description of a personal key 136 is described in U.S. patent application Ser. No. 09/449,159, filed Nov. 24, 1999, by Shawn D. Abbott, Bahram Afghani, Mehdi Sotoodeh, Norman L. Denton III, and Calvin W. Long, entitled "USB-COMPLIANT PERSONAL KEY WITH INTEGRAL INPUT AND OUTPUT DEVICES," which application is incorporated by reference herein.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

The computer 102 may be communicatively coupled to a remote computer or server 134 via communication medium 132 such as a dial-up network, a wide area network (WAN), local area network (LAN), virtual private network (VPN) or the Internet. Program instructions for computer operation, including additional or alternative application programs can be loaded from the remote computer/server 134. In one embodiment, the computer 102 implements an Internet browser, allowing the user to access the world wide web (WWW) and other internet resources.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Prime Number Generation

The personal token 136 may be utilized to generate prime numbers for use in encryption keys (e.g., an RSA key pair). However, because of the hardware limitations on personal token 136, a significant amount of time may be consumed determining such prime numbers. The invention attempts to expedite such a determination and generation of prime numbers.

To rapidly determine if a number is prime, the evaluation of prime factors is performed rapidly. In one or more embodiments, prime factors whose value is less than two hundred and fifty-six (256) are rapidly evaluated. There are fifty-three (53) odd prime numbers less than 256: 3, 5, 7, 11, 13, 17, 19, 23, 29, 31, 37, 41, 43, 47, 53, 59, 61, 67, 71, 73, 79, 83, 89, 97, 101, 103, 107, 109, 113, 127, 131, 137, 139, 149, 151, 157, 163, 167, 173, 179, 181, 191, 193, 197, 199, 211, 223, 227, 229, 233, 239, 241, and 251.

To rapidly evaluate such prime factors, a table of mod remainders for the odd prime numbers is maintained. Each entry in the table may be stored in a single byte (e.g., if primes less than 256 are utilized). The table is first initialized for a candidate large prime number using conventional mod operations. Thus, a table entry is entered for each prime number less than 256 with the mod remainder from the candidate large prime mod each primete number. For example, assuming that the candidate large prime is five hundred and sixty-seven (567), Table 1 illustrates an initialized table. It should be noted that the prime numbers themselves may not be in the table. In this regard, the table may comprise a single list of mod remainders with each entry corresponding to a particular prime number.

TABLE 1

| PRIME | MOD |
| --- | --- |
| 3 | 0 |
| 5 | 2 |
| 7 | 0 |
| 11 | 6 |
| 13 | 8 |
| 17 | 6 |
| 19 | 16 |
| 23 | 15 |
| 29 | 16 |
| 31 | 9 |
| 37 | 12 |
| 41 | 34 |
| 43 | 8 |
| 47 | 3 |
| 53 | 37 |
| 59 | 36 |
| 61 | 18 |
| 67 | 31 |
| 71 | 70 |
| 73 | 56 |
| 79 | 14 |
| 83 | 69 |
| 89 | 33 |
| 97 | 82 |
| 101 | 62 |
| 103 | 52 |
| 107 | 32 |
| 109 | 22 |
| 113 | 2 |
| 127 | 59 |
| 131 | 43 |
| 137 | 19 |
| 139 | 11 |

TABLE 1-continued

| PRIME | MOD |
|---|---|
| 149 | 120 |
| 151 | 114 |
| 157 | 96 |
| 163 | 78 |
| 167 | 66 |
| 173 | 48 |
| 179 | 30 |
| 181 | 24 |
| 191 | 185 |
| 193 | 181 |
| 197 | 173 |
| 199 | 169 |
| 211 | 145 |
| 223 | 121 |
| 227 | 113 |
| 229 | 109 |
| 233 | 101 |
| 239 | 89 |
| 241 | 85 |
| 251 | 65 |

Once initialized, the mod remainder table entries are examined to determine if any have a zero-value (i.e., to ensure that all entries are non-zero). If one of the mod remainder table entries has a zero-value, the candidate large prime number is not a prime number. Accordingly, the candidate large prime number and each mod remainder table entry are decremented by a specific value. For example, in one or more embodiments, the candidate large prime number and each mod remainder table entry is decremented by 2. Alternatively, as described below, a candidate large prime and each mod remainder table entry may be incremented by an even number (e.g., by 2).

Referring to the example of Table 1, since there are several entries with a zero value, each entry must be decremented by 2. However, if any resulting table entry is less than zero (0), the corresponding prime is added to the entry to maintain the mod remainder nature. Table 2 illustrates the decremented mod remainder table for the new candidate large prime number 565 (567-2).

TABLE 2

| PRIME | MOD |
|---|---|
| 3 | -2 + 3 = 1 |
| 5 | 0 |
| 7 | -2 + 7 = 5 |
| 11 | 4 |
| 13 | 6 |
| 17 | 4 |
| 19 | 14 |
| 23 | 13 |
| 29 | 14 |
| 31 | 7 |
| 37 | 10 |
| 41 | 32 |
| 43 | 6 |
| 47 | 1 |
| 53 | 35 |
| 59 | 34 |
| 61 | 16 |
| 67 | 29 |
| 71 | 68 |
| 73 | 54 |
| 79 | 12 |
| 83 | 67 |
| 89 | 31 |
| 97 | 80 |
| 101 | 60 |
| 103 | 50 |

TABLE 2-continued

| PRIME | MOD |
|---|---|
| 107 | 30 |
| 109 | 20 |
| 113 | 0 |
| 127 | 57 |
| 131 | 41 |
| 137 | 17 |
| 139 | 9 |
| 149 | 118 |
| 151 | 112 |
| 157 | 94 |
| 163 | 76 |
| 167 | 64 |
| 173 | 46 |
| 179 | 28 |
| 181 | 22 |
| 191 | 183 |
| 193 | 179 |
| 197 | 171 |
| 199 | 167 |
| 211 | 143 |
| 223 | 119 |
| 227 | 111 |
| 229 | 107 |
| 233 | 99 |
| 239 | 87 |
| 241 | 83 |
| 251 | 63 |

The examination of the table and decrementing of entries continues until all entries are non-zero. For example, since a zero-entry exists in Table 2, the process is repeated again by decrementing the candidate large prime number (565-2=563) and each mod remainder entry by two (2). Once again, if the result is less than zero, the corresponding prime is added to maintain the mod remainder nature. Table 3 illustrates the results of decrementing and adjusting Table 2 for the candidate prime 563.

TABLE 3

| PRIME | MOD |
|---|---|
| 3 | -1 + 3 = 2 |
| 5 | -2 + 5 = 3 |
| 7 | 3 |
| 11 | 2 |
| 13 | 4 |
| 17 | 2 |
| 19 | 12 |
| 23 | 11 |
| 29 | 12 |
| 31 | 5 |
| 37 | 8 |
| 41 | 30 |
| 43 | 4 |
| 47 | -1 + 47 = 46 |
| 53 | 33 |
| 59 | 32 |
| 61 | 14 |
| 67 | 27 |
| 71 | 66 |
| 73 | 52 |
| 79 | 10 |
| 83 | 65 |
| 89 | 29 |
| 97 | 78 |
| 101 | 58 |
| 103 | 48 |
| 107 | 28 |
| 109 | 18 |
| 113 | -2 + 113 = 111 |
| 127 | 55 |
| 131 | 39 |

TABLE 3-continued

| PRIME | MOD |
|---|---|
| 137 | 15 |
| 139 | 7 |
| 149 | 116 |
| 151 | 110 |
| 157 | 92 |
| 163 | 74 |
| 167 | 62 |
| 173 | 44 |
| 179 | 26 |
| 181 | 20 |
| 191 | 181 |
| 193 | 177 |
| 197 | 169 |
| 199 | 165 |
| 211 | 141 |
| 223 | 117 |
| 227 | 109 |
| 229 | 105 |
| 233 | 97 |
| 239 | 85 |
| 241 | 81 |
| 251 | 61 |

Once the table contains all non-zero entries, it may be understood that there are no prime factors for the candidate prime that are less than 256. Accordingly, the candidate prime number is then tested to determine primality. Such testing may be performed using any of the available prime number testing techniques (e.g., Solovay-Strassen, Lehmann, Rabin-Miller, etc.). Such testing techniques are more fully described in Bruce Schneier, "Applied Cryptography, Second Edition, Protocols, Algorithms, and Source Code in C", pages 233–263 (John Wiley & Sons, Inc. 1996).

In one or more embodiments of the invention, the candidate prime number is tested using Fermat's Little Theorem (referred to as Fermat testing). Fermat's Little Theorem provides that if m is prime, and $\alpha$ is not a multiple of m, then:

$$\alpha^{m-1} \equiv 1 \pmod{m}$$

Using Fermat's Little Theorem, the candidate prime 563 may be tested. Supposing $\alpha=600$ (not a multiple of 563), the equation provides:

$600^{563-1} \equiv 1 \pmod{563} = 600^{562} \equiv 1 \pmod{563} =$

20941255502050031791735510252279872471560323132024

81715718404944018379875931754508175806516096541689

24875937123308211215844843079971255531748855023173

72838539355742227478371517224394178377059862669354

73841033734420632795364375254492435374275223257672

64597602352449206690879218257421682942978363666411

18205509560205653812207379442766425836929533863612

30397394929396043561263744623938341320292400656650

65435658951551111748756654118808846336000 ...000 ≡ 1(mod 563)

(at the end there is 562×2 = 1124 zeroes)

Using modular arithmetic, the above equations evaluate true. Thus, the number 563 may be considered a prime number for use in key generation. Alternatively, once Fermat testing tests positive for primality, the candidate prime number may be further examined to ensure its primality (e.g., by evaluating factors over 256 or using alternative primality testing techniques).

Figure 2:
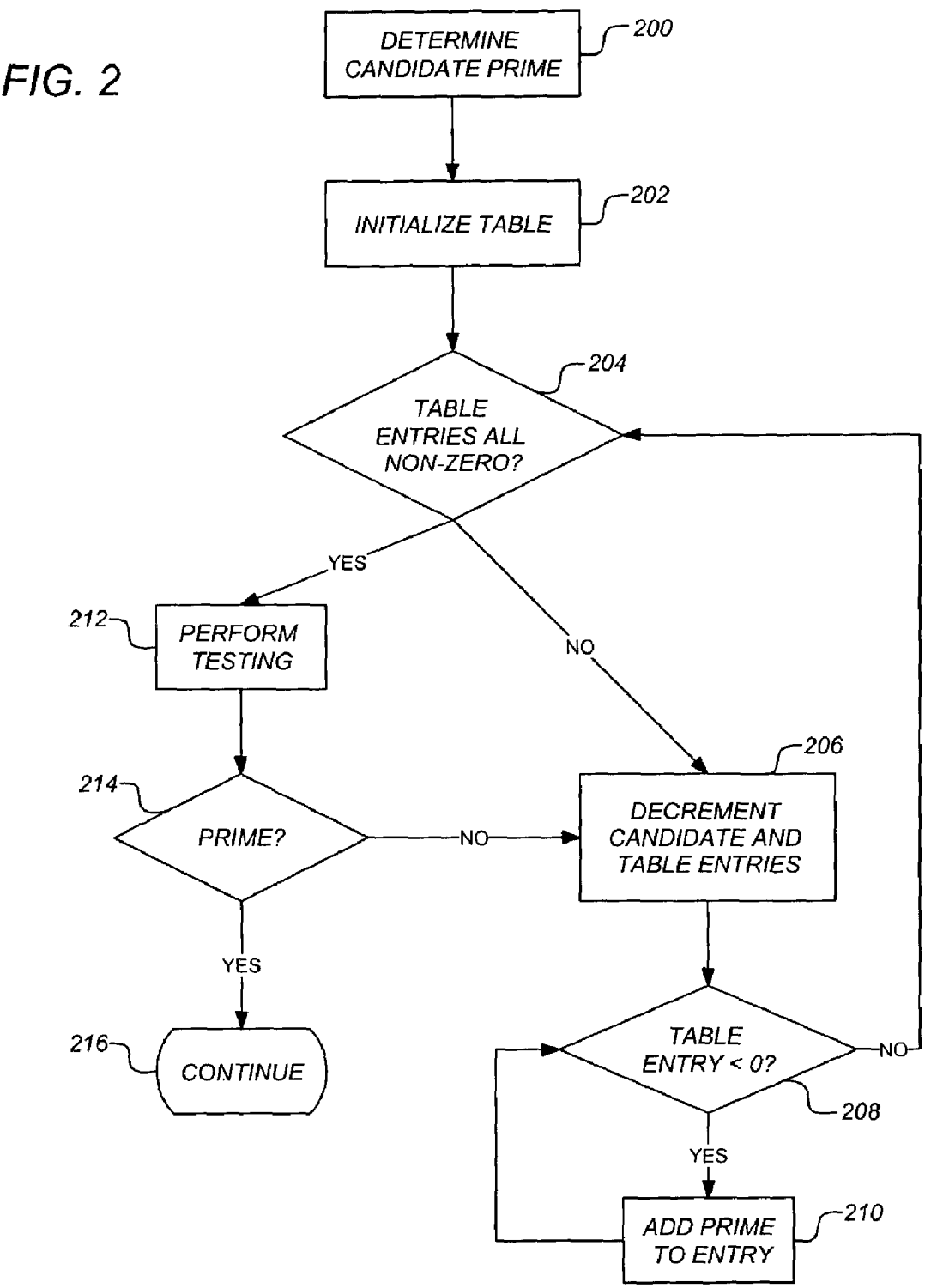
FIG. 2 is a flow-chart illustrating the generation of a prime number in accordance with one or more embodiments of the invention.

FIG. 2 is a flow-chart illustrating the generation of a prime number in accordance with one or more embodiments of the invention. At step 200, a candidate prime number is determined. At step 202, the table is initialized with mod remainders for one or more prime numbers resulting from the candidate large prime number mod each prime number. A step 204, a determination is made regarding whether all of the table entries are non-zero.

If there is a mod remainder entry with a value of zero, the candidate large prime number and each mod remainder entry is decremented (e.g., by two) at step 206. A determination is made at step 208 if any mod remainder entry has a value less than zero. If an entry is less than zero, the corresponding prime number is added to the mod remainder value to maintain the mod remainder nature at step 210. Steps 208 and 210 are repeated until all entries are greater than or equal to zero. Thereafter, the process continues at step 204.

Once all mod remainder entries in the table are non-zero (i.e., as determined at step 204), primality testing is performed on the candidate prime number at step 212 (e.g., Fermat testing). If the candidate prime number does not test as a prime number, processing continues at step 206 where the values are decremented as described above. If the primality test is positive for primality, processing continues at step 216. Such continued processing may comprise further testing. Once a satisfactory candidate number is obtained, the candidate number maybe used as a prime number in the generation of a cryptographic key in a cryptographic system (e.g., as part of an RSA key pair).

Figure 3:
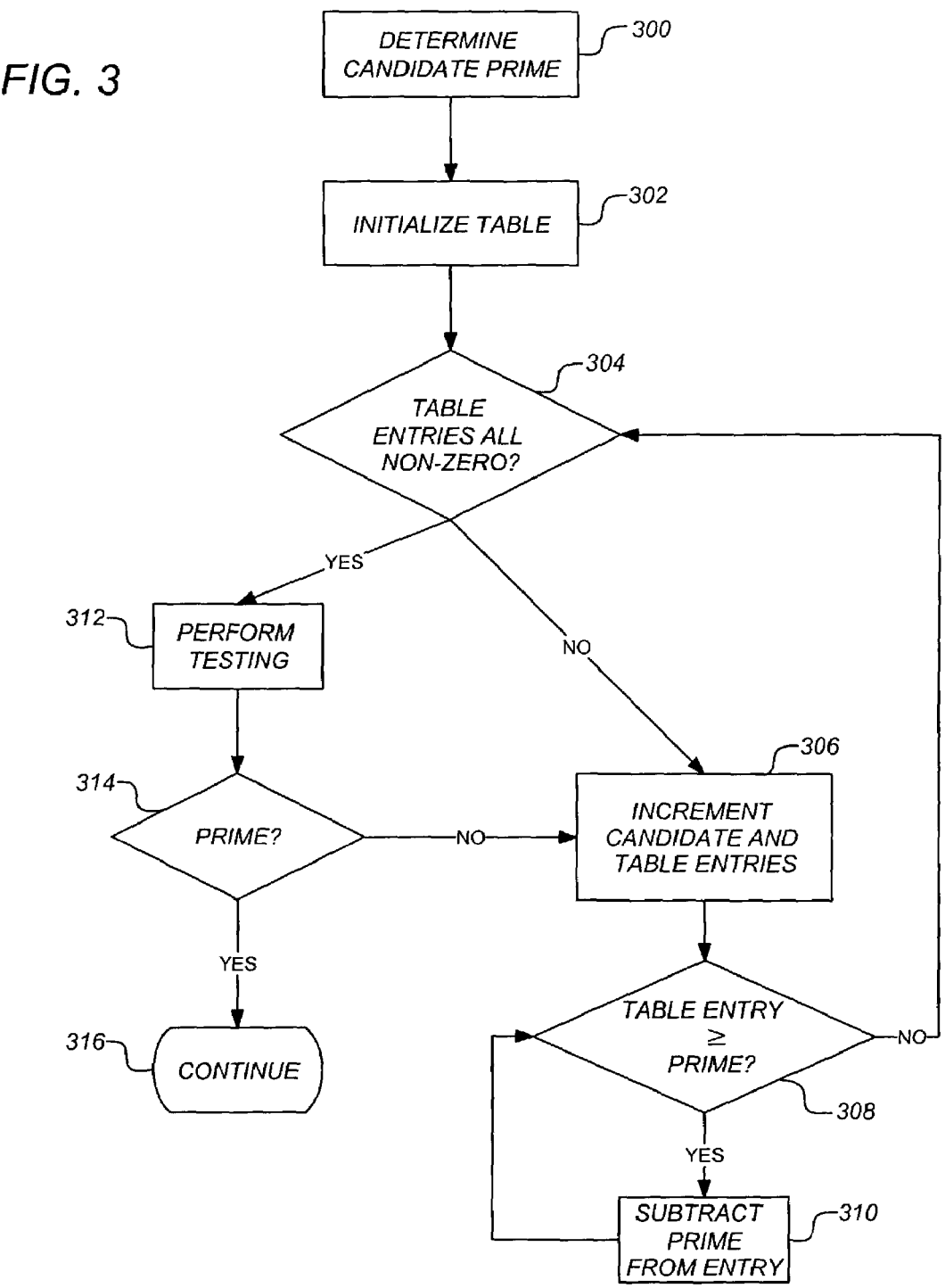
FIG. 3 is a flow-chart illustrating the generation of a prime number in accordance with one or more alternative embodiments of the invention.

In an alternative embodiment, instead of decrementing a candidate large prime and all table entries, the candidate large prime and table entries may be incremented by an even number. FIG. 3 is a flow chart illustrating one or more embodiments where the candidate large prime and table entries are incremented. At step 300, a candidate prime number is determined. At step 302, the table is initialized with mod remainders for one or more prime numbers resulting from the candidate large prime number mod each prime number. A step 304, a determination is made regarding whether all of the table entries are non-zero.

If there is a mod remainder entry with a value of zero, the candidate large prime number and each mod remainder entry is incremented by an event number (e.g., by two) at step 306. A determination is made at step 308 if any mod remainder entry has a value that is greater than or equal to the corresponding prime number. If an entry is greater than or equal to the corresponding prime number, the corresponding prime number is subtracted from the mod remainder value to maintain the mod remainder nature at step 310. Steps 308 and 310 are repeated until all entries are less than the corresponding prime. Thereafter, the process continues at step 304.

Once all mod remainder entries in the table are non-zero (i.e., as determined at step 304), primality testing is performed on the candidate prime number at step 312 (e.g., Fermat testing). If the candidate prime number does not test as a prime number, processing continues at step 306 where the values are imcremented as described above. If the primallty test is positive for primallty, processing continues at step 316. Such continued processing may comprise further testing. Once a satisfactory candidate number is obtained, the candidate number may be used as a prime number in the generation of a cryptographic key in a cryptographic system (e.g., as part of an RSA key pair).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide for the rapid generation of large prime numbers on a token. The concept behind the invention is to speed up the evaluation of prime factors whose value is less than a certain value (e.g., 256). This can be accomplished by maintaining a table of mod remainders for all odd prime numbers less than the value where each entry is a single byte.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating a prime number to be utilized in a cryptographic key of a cryptographic system, comprising:
    (a) determining a candidate prime number;
    (b) initializing a table comprising a mod remainder for one or more prime numbers resulting from the candidate prime number mod each of the one or more prime numbers;
    (c) determining if all mod remainder entries in the table are non-zero;
    (d) if all mod remainder entries in the table are non-zero:
        (i) testing the candidate prime number to determine if the candidate prime number is a prime number;
        (ii) if the candidate prime number tests as a prime number, utilizing the candidate prime number in a cryptographic key of a cryptographic system;
    (e) if all mod remainder entries in the table are not non-zero:
        (i) decrementing by an even number the candidate prime number and all mod remainder entries;
        (ii) if any mod remainder entry is less than zero (0), adding the corresponding prime number to the mod remainder; and
        (iii) repeating steps (c)–(e).

2. The method of claim 1, wherein the one or more prime numbers are less than two hundred and fifty-six (256).

3. The method of claim 2, wherein each entry in the table is a single byte.

4. The method of claim 1, wherein the testing comprises Fermat testing.

5. The method of claim 1, wherein the candidate prime number and all mod remainder entries are decremented by two (2) when all mod remainder entries in the table are not non-zero.

6. The method of claim 1, wherein if the candidate prime number does not test as a prime number, the method further comprises:
    (i) decrementing by an even number the candidate prime number and all mod remainder entries;
    (ii) if any mod remainder entry is less than zero (0), adding the corresponding prime number to the mod remainder; and
    (iii) repeating steps (c)–(e).

7. The method of claim 1, wherein the cryptographic key is an RSA key.

8. The method of claim 1, wherein the cryptographic key is used in a cryptographic hardware token.

9. An apparatus for generating a prime number to be utilized in a cryptographic key of a cryptographic system comprising:
    (a) a processor;
    (b) a memory, communicatively coupled to the processor;
    (c) an application executing on the processor, wherein the application is configured to:
        (i) determine a candidate prime number;
        (ii) initialize a table comprising a mod remainder for one or more prime numbers resulting from the candidate prime number mod each of the one or more prime numbers
        (iii) determine if all mod remainder entries in the table are non-zero;
        (iv) if all mod remainder entries in the table are non-zero:
            (1) test the candidate prime number to determine if the candidate prime number is a prime number;
            (2) if the candidate prime number tests as a prime number, store the candidate prime number in the memory of for use as part of a cryptographic key;
        (v) if all mod remainder entries in the table are not non-zero:
            (1) decrement by an even number the candidate prime number and all mod remainder entries;
            (2) if any mod remainder entry is less than zero (0), add the corresponding prime number to the mod remainder; and
            (3) repeat steps (iii)–(v).

10. The apparatus of claim 9, wherein the one or more prime numbers are less than two hundred and fifty-six (256).

11. The apparatus of claim 10, wherein each entry in the table is a single byte.

12. The apparatus of claim 9, wherein the testing comprises Fermat testing.

13. The apparatus of claim 9, wherein the candidate prime number and all mod remainder entries are decremented by two (2) when all mod remainder entries in the table are not non-zero.

14. The apparatus of claim 9, wherein if the candidate prime number does not test as a prime number, the application is further configured to:
    (1) decrement by an even number the candidate prime number and all mod remainder entries;
    (2) if any mod remainder entry is less than zero (0), add the corresponding prime number to the mod remainder; and
    (3) repeat steps (iii)–(v).

15. The apparatus of claim 9, wherein the cryptographic key is an RSA key.

16. The apparatus of claim 9, wherein the apparatus is a cryptographic hardware token.

17. An article of manufacture comprising a program storage medium readable by a computer and embodying one or more instructions executable by the computer to perform a method for generating a prime number to be utilized in a cryptographic key of a cryptographic system, the method comprising:
  (a) determining a candidate prime number;
  (b) initializing a table comprising a mod remainder for one or more prime numbers resulting from the candidate prime number mod each of the one or more prime numbers;
  (c) determining if all mod remainder entries in the table are non-zero;
  (d) if all mod remainder entries in the table are non-zero:
    (i) testing the candidate prime number to determine if the candidate prime number is a prime number;
    (ii) if the candidate prime number tests as a prime number, utilizing the candidate prime number in a cryptographic key of a cryptographic system;
  (e) if all mod remainder entries in the table are not non-zero:
    (i) decrementing by an even number the candidate prime number and all mod remainder entries;
    (ii) if any mod remainder entry is less than zero (0) adding the corresponding prime number to the mod remainder; and
    (iii) repeating steps (c)–(e).

18. The article of manufacture of claim 17, wherein the one or more prime numbers are less than two-hundred and fifty-six (256).

19. The article of manufacture of claim 18, wherein each entry in the table is a single byte.

20. The article of manufacture of claim 17, wherein testing comprises Fermat testing.

21. The article of manufacture of claim 17, wherein the candidate prime number and all mod remainder entries are decremented by two (2) when all mod remainder entries in the table are not non-zero.

22. The article of manufacture of claim 17, wherein if the candidate prime number does not test as a prime number, the method further comprises:
  (i) decrementing by an even number the candidate prime number and all mod remainder entries;
  (ii) if any mod remainder entry is less than zero (0), adding the corresponding prime number to the mod remainder; and
  (iii) repeating steps (c)–(e).

23. The article of manufacture of claim 17, wherein the cryptographic key is an RSA key.

24. The article of manufacture of claim 17, wherein the cryptographic key is used in a cryptographic hardware token.

25. A method for generating a prime number to be utilized in a cryptographic key of a cryptographic system, comprising:
  (a) determining a candidate prime number;
  (b) initializing a table comprising a mod remainder for one or more prime numbers resulting from the candidate prime number mod each of the one or more prime numbers;
  (c) determining if all mod remainder entries in the table are non-zero;
  (d) if all mod remainder entries in the table are non-zero:
    (i) testing the candidate prime number to determine if the candidate prime number is a prime number;
    (ii) if the candidate prime number tests as a prime number, utilizing the candidate prime number in a cryptographic key of a cryptographic system;
  (e) if all mod remainder entries in the table are not non-zero:
    (i) incrementing by an even number the candidate prime number and all mod remainder entries;
    (ii) if any mod remainder entry is greater than or equal to the corresponding prime number, subtracting the corresponding prime number from the mod remainder; and
    (iii) repeating steps (c)–(e).

26. The method of claim 25, wherein the one or more prime numbers are less than two hundred and fifty-six (256).

27. The method of claim 26, wherein each entry in the table is a single byte.

28. The method of claim 25, wherein the testing comprises Fermat testing.

29. The method of claim 25, wherein the candidate prime number and all mod remainder entries are incremented by two (2) when all mod remainder entries in the table are not non-zero.

30. The method of claim 25, wherein if the candidate prime number does not test as a prime number, the method further comprises:
  (i) incrementing by an even number the candidate prime number and all mod remainder entries;
  (ii) if any mod remainder entry is greater than or equal to the corresponding prime number, subtracting the corresponding prime number from the mod remainder; and
  (iii) repeating steps (c)–(e).

31. The method of claim 25, wherein the cryptographic key is an RSA key.

32. The method of claim 25, wherein the cryptographic key is used in a cryptographic hardware token.

33. An apparatus for generating a prime number to be utilized in a cryptographic key of a cryptographic system comprising:
  (a) a processor;
  (b) a memory, communicatively coupled to the processor;
  (c) an application executing on the processor, wherein the application is configured to:
    (i) determine a candidate prime number;
    (ii) initialize a table comprising a mod remainder for one or more prime numbers resulting from the candidate prime number mod each of the one or more prime numbers
    (iii) determine if all mod remainder entries in the table are non-zero;
    (iv) if all mod remainder entries in the table are non-zero:
      (1) test the candidate prime number to determine if the candidate prime number is a prime number;
      (2) if the candidate prime number tests as a prime number, store the candidate prime number in the memory of for use as part of a cryptographic key;
    (v) if all mod remainder entries in the table are not non-zero:
      (1) increment by an even number the candidate prime number and all mod remainder entries;
      (2) if any mod remainder entry is greater than or equal to the corresponding prime number, subtract the corresponding prime number from the mod remainder; and
      (3) repeat steps (iii)–(v).

34. The apparatus of claim 33, wherein the one or more prime numbers are less than two hundred and fifty-six (256).

35. The apparatus of claim 34, wherein each entry in the table is a single byte.

36. The apparatus of claim 33, wherein the testing comprises Fermat testing.

37. The apparatus of claim 33, wherein the candidate prime number and all mod remainder entries are incremented by two (2) when all mod remainder entries in the table are not non-zero.

38. The apparatus of claim 33, wherein if the candidate prime number does not test as a prime number, the application is further configured to:
  (1) increment by an even number the candidate prime number and all mod remainder entries;
  (2) if any mod remainder entry is greater than or equal to the corresponding prime number, subtract the corresponding prime number from the mod remainder; and
  (3) repeat steps (iii)–(v).

39. The apparatus of claim 33, wherein the cryptographic key is an RSA key.

40. The apparatus of claim 33, wherein the apparatus is a cryptographic hardware token.

41. An article of manufacture comprising a program storage medium readable by a computer and embodying one or more instructions executable by the computer to perform a method for generating a prime number to be utilized in a cryptographic key of a cryptographic system, the method comprising:
  (a) determining a candidate prime number;
  (b) initializing a table comprising a mod remainder for one or more prime numbers resulting from the candidate prime number mod each of the one or more prime numbers;
  (c) determining if all mod remainder entries in the table are non-zero;
  (d) if all mod remainder entries in the table are non-zero:
    (i) testing the candidate prime number to determine if the candidate prime number is a prime number;
    (ii) if the candidate prime number tests as a prime number, utilizing the candidate prime number in a cryptographic key of a cryptographic system;
  (e) if all mod remainder entries in the table are not non-zero:
    (i) incrementing by an even number the candidate prime number and all mod remainder entries;
    (ii) if any mod remainder entry is greater than or equal to the corresponding prime number, subtracting the corresponding prime number from the mod remainder; and
    (iii) repeating steps (c)–(e).

42. The article of manufacture of claim 41, wherein the one or more prime numbers are less than two-hundred and fifty-six (256).

43. The article of manufacture of claim 42, wherein each entry in the table is a single byte.

44. The article of manufacture of claim 41, wherein the testing comprises Fermat testing.

45. The article of manufacture of claim 41, wherein the candidate prime number and all mod remainder entries are incremented by two (2) when all mod remainder entries in the table are not non-zero.

46. The article of manufacture of claim 41, wherein if the candidate prime number does not test as a prime number, the method further comprises:
  (i) incrementing by an even number the candidate prime number and all mod remainder entries;
  (ii) if any mod remainder entry is greater than or equal to the corresponding prime number, subtracting the corresponding prime number from the mod remainder; and
  (iii) repeating steps (c)–(e).

47. The article of manufacture of claim 41, wherein the cryptographic key is an RSA key.

48. The article of manufacture of claim 41, wherein the cryptographic key is used in a cryptographic hardware token.

* * * * *